US008582735B2

(12) United States Patent
Lin et al.

(10) Patent No.: US 8,582,735 B2
(45) Date of Patent: *Nov. 12, 2013

(54) SYSTEM AND METHOD FOR MONITORING AND HANDLING TELECOMMUNICATION ACTIVITY VIA A COMPUTER NETWORK

(75) Inventors: Geoffrey S. Lin, Duluth, GA (US);
Patrick D. Sullivan, Roswell, GA (US);
Robert G. Hensey, Norcross, GA (US);
John L. Bradberry, Jonesboro, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1633 days.

This patent is subject to a terminal disclaimer.

(21) Appl. No.: 11/676,892

(22) Filed: Feb. 20, 2007

(65) Prior Publication Data
US 2007/0140448 A1      Jun. 21, 2007

Related U.S. Application Data

(63) Continuation of application No. 10/261,337, filed on Sep. 30, 2002, now Pat. No. 7,184,527.

(51) Int. Cl.
*H04M 11/00* (2006.01)
(52) U.S. Cl.
CPC ..................... *H04M 11/00* (2013.01)
USPC ................... 379/93.17; 379/352; 379/220.01; 379/93.01; 370/352; 455/415
(58) Field of Classification Search
USPC .......... 379/93.01, 93.02, 93.17, 93.19, 93.35, 379/220.01; 455/415, 417, 418; 370/271, 370/352
See application file for complete search history.

(56) References Cited

U.S. PATENT DOCUMENTS

| 5,422,936 | A | | 6/1995 | Atwell |
| 5,638,448 | A | * | 6/1997 | Nguyen ........................ 380/29 |
| 5,809,128 | A | * | 9/1998 | McMullin ................ 379/215.01 |
| 5,907,604 | A | | 5/1999 | Hsu |
| 5,999,611 | A | | 12/1999 | Tatchell et al. |
| 6,144,644 | A | | 11/2000 | Bajzath et al. |
| 6,154,646 | A | | 11/2000 | Tran et al. |
| 6,366,661 | B1 | * | 4/2002 | Devillier et al. ......... 379/211.01 |
| 6,389,124 | B1 | | 5/2002 | Schnarel et al. |
| 6,542,475 | B1 | | 4/2003 | Bala et al. |
| 6,567,671 | B2 | | 5/2003 | Amin |
| 6,574,471 | B1 | | 6/2003 | Rydbeck |
| 6,614,888 | B1 | | 9/2003 | Andreason |
| 6,631,186 | B1 | | 10/2003 | Adams et al. |
| 6,665,388 | B2 | | 12/2003 | Bedingfield |
| 6,693,897 | B1 | | 2/2004 | Huang |

(Continued)

*Primary Examiner* — Melur Ramakrishnaiah

(57) ABSTRACT

A configurable PSTN call-handling (CPC) service enables monitoring and custom responses to calls received over multiple subscriber lines. A CPC Client Program runs on a computer and presents a graphical user interface (GUI) that allows the user to associate call-handling options with call characteristics. The GUI also allows the user to customize the notification signals provided and to provide custom responses to certain callers, by associating call characteristics with various GUI appearances, sound files, or images. The CPC relieves the communications network of performing certain call-handling functions, such as call forwarding, by moving decision-making processes to the user's PC. The user can remotely monitor any subscriber line associated with the user from any browser, because the communications network sends notifications directly to an IP address specified by the user. The IP address associated with a computer connected to the subscriber line need not be the IP address specified by the user.

27 Claims, 14 Drawing Sheets

(56) References Cited

U.S. PATENT DOCUMENTS

| | | |
|---|---|---|
| 6,757,274 B1 | 6/2004 | Bedingfield et al. |
| 7,106,843 B1 | 9/2006 | Gainsboro et al. |
| 7,184,527 B1 | 2/2007 | Lin et al. |
| 2001/0051534 A1 | 12/2001 | Amin |
| 2002/0076022 A1* | 6/2002 | Bedingfield ............ 379/142.01 |
| 2002/0141559 A1* | 10/2002 | Gurgun .................. 379/215.01 |
| 2002/0146105 A1 | 10/2002 | McIntyre |
| 2002/0168055 A1 | 11/2002 | Crockett et al. |
| 2003/0007617 A1 | 1/2003 | McAlinden |
| 2003/0128691 A1 | 7/2003 | Bergman et al. |
| 2003/0156690 A1 | 8/2003 | Crockett et al. |
| 2003/0224795 A1 | 12/2003 | Wilhoite et al. |
| 2004/0109551 A1 | 6/2004 | Simpson et al. |
| 2005/0157860 A1 | 7/2005 | Schnarel et al. |
| 2005/0213740 A1 | 9/2005 | Williams et al. |

\* cited by examiner

| ICW User Call Log - 49 calls | | | | | |
|---|---|---|---|---|---|
| Time | Date | Name or Location | Caller Phone | Call Status | Number Called |
| 07:25:22 | Wed Sep... | BELLSOUTH | (770) 210-9830 | Caller Hung Up or Timeout | (770) 478-0325 |
| 14:31:24 | Mon Sep... | BRADBERRY J... | (678) 613-7962 | User Ignored | (770) 478-0325 |
| 12:41:22 | Sat Jun 29 | BELLSOUTH | (770) 210-9830 | Forward To 404 3322319 | (770) 478-0325 |
| 18:31:37 | Wed Ma... | HOWARD JAC... | (770) 996-0316 | User Answered | (770) 478-0325 |
| 17:45:33 | Sat May 11 | BRADBERRY J... | (678) 613-7962 | Forward To 404 3322319 | (770) 478-0325 |
| 17:44:13 | Sat May 11 | BRADBERRY J... | (678) 613-7962 | Forward To 404 3322319 | (770) 478-0325 |
| 14:19:04 | Sat May 11 | BRADBERRY J... | (678) 613-7962 | Caller Hung Up or Timeout | (770) 478-0325 |
| 09:28:55 | Sat May 11 | BRADBERRY J... | (678) 613-7962 | Caller Hung Up or Timeout | (770) 478-0325 |
| 09:28:20 | Sat May 11 | BRADBERRY J... | (678) 613-7962 | Forward To (404) 332-2319 | (770) 478-0325 |
| 09:27:22 | Sat May 11 | BRADBERRY J... | (678) 613-7962 | Caller Hung Up or Timeout | (770) 478-0325 |
| 09:26:34 | Sat May 11 | BRADBERRY J... | (678) 613-7962 | | |

FIG. 8

REGISTRATION

| Step | User PC | | CPC Gateway Interface | | Dataserver (DS) |
|---|---|---|---|---|---|
| 1302 | version<br>DN<br>handshake | → | version compatible? | | |
| | | ← | no, Error | | |
| 1304 | | | yes, send DN | → | DS retrieves record |
| | | | | ← | If Error, Exit |
| | | ← | encrypt(pckey), exit | | |
| 1306 | | | generate session key (skey) | | |
| 1308 | | | handshake acknowledgement | | |
| | | ← | encrypt (pckey) | | |
| 1310 | password<br>DN<br>IP address<br>pcRegister | → | | | |
| 1312 | encrypt(skey) | → | does DN match handshake DN? | | |
| | | ← | encrypt(skey), Exit | | |
| 1314 | | | password match?<br>no, Error | | |
| | | ← | encrypt(skey), Exit<br>no, update DS with ++try, timestamp | | |
| 1316 | | | | → | DS updates record |
| | | | DS problem?<br>yes, Error | | |
| | | ← | encrypt(skey), Exit | | |
| 1318 | | | connect to pc<br>connect problem?<br>yes, Error | | |
| | | ← | encrypt(skey), Exit | | |
| 1320 | | | Test | | |
| | | ← | encrypt(skey), Exit<br>write pc problem?<br>yes, Error | | |
| | | ← | encrypt(skey), Exit | | |
| 1324 | pcTestAck<br>encrypt(skey) | → | receive problem?<br>yes, Error | | |
| | | ← | encrypt(skey), Exit | | |
| 1328 | | | update DS<br>IP address<br>skey<br>timestamp<br>try = 0 | | |
| 1330 | | | Update DS | → | |
| | | | DS problem?<br>yes, Error<br>encrypt(skey), Exit | | |
| 1332 | | | pcRegAck | | |
| | | ← | encrypt(skey) | | |
| 1334 | | | old IP address from DS != '-' ? | | |
| 1336 | | | yes, send pcKnockoff to old pc<br>exit | | |

FIG. 13

NOTIFICATION

| Step | SCP | CPC Gateway Interface | | User PC |
|---|---|---|---|---|
| 1402 | IP address<br>session key<br>caller name<br>caller DN<br>timestamp | | | |
| 1404 | callNotify | → | connect to PC IP address | |
| | | | fail, Exit | |
| 1406 | | | success, Send<br>caller name<br>caller DN<br>timestamp<br>encrypt(skey) | |
| 1408 | | | callNotify | → | PC decrypts, displays,<br>get disposition, sends |
| 1410 | | | | a disposition:<br>encrypt(skey) |
| 1412 | | | decrypt and send msg to SCP | |
| | | ← | exit | |
| SCP performs action | | | | |

FIG. 14

SYSTEM AND METHOD FOR MONITORING AND HANDLING TELECOMMUNICATION ACTIVITY VIA A COMPUTER NETWORK

CROSS REFERENCE TO RELATED APPLICATIONS

The present application is a continuation of U.S. patent application Ser. No. 10/261,337, filed Sep. 30, 2002 (U.S. Pat. No. 7,184,527), which application is assigned to the same entity and incorporated herein by reference in its entirety.

FIELD OF INVENTION

The present invention relates to telecommunications and computer networks, and particularly, to monitoring telecommunication activity using the Internet.

BACKGROUND OF THE INVENTION

Telephones provide a great convenience to users by allowing fast, reliable, and widespread communication. Call-handling technologies, such as caller identification (caller ID), call waiting, selective call forwarding, voicemail, and distinctive ringing have been developed to enhance this convenience. Call-handling enables the recipient of an incoming call the ability to identify the source of the call, and to handle the incoming call accordingly. For purposes of time management, security, and convenience, a recipient may choose to screen, monitor, and/or prioritize calls from a certain source or during a certain time period.

Call-handling is particularly useful to individuals who use a subscriber line to access a computer network, such as the Internet. When these individuals are connected to the Internet, incoming calls can present several problems. If a call waiting service is not enabled, the subscriber line will ring busy for the duration of the Internet session. If a call waiting feature is enabled, each call to the subscriber line will disrupt the network session, and reconnection is likely required. A user can usually disable call waiting for the duration of the session by entering a special code, such as *70, prior to dialing into the Internet. When call waiting is disabled, incoming calls are blocked or sent to a central office based voicemail service.

Call forwarding services provide another option for handling calls during an online session. Using call forwarding, the user can designate a directory number that will receive all calls while the user is online. Voicemail, call forwarding, and call waiting features are subscription services that are typically available for a monthly fee, in addition to the charge for telephone service. However, these services may not give the user the flexibility to handle calls according to the source of the calls. Rather, all calls are handled in the same manner while the features are activated and the user is online.

Internet call waiting (ICW) offers one approach to providing users with flexible call-handling abilities. Internet call waiting is typically implemented using an ICW application installed on a personal computer (PC) in combination with call waiting or call forwarding subscriptions provided by a telephone company. ICW applications detect incoming calls while the user's PC is connected to a computer network via a subscriber line. To activate an ICW session, the user launches the ICW application and uses the subscriber line to dial a special code, such as *95 Some ICW applications require the user to connect to the Internet as well. Upon detecting an incoming call, the ICW application supplies the user with a visual and/or audible cue that notifies the user of the incoming call, identifies the source of the call, and/or prompts the user to select the desired call handling option. The ICW application can identify the source of the incoming call using data provided by a caller ID subscription, and displays the call information on the user's screen. To decide how to handle a call using Internet call waiting or to otherwise monitor incoming calls, the user must have access to a caller identification subscription service. Caller ID subscriptions provide users with the telephone number and/or name associated with incoming calls. In conjunction with ICW, the user's computer displays caller information in the same manner as a caller ID device. Based upon the call information, the user decides whether to take the call and discontinue the online session.

Alternatively, the user or the ICW software can forward the call to a remote server using a call forwarding subscription. The remote server captures the information identifying the source of the incoming call, and then displays this identifying information on the user's PC. The remote server accesses the user's PC using the IP address that is randomly assigned to the Internet session established using the users directory number.

There are several disadvantages to the call forwarding approach for ICW. The call forwarding service must be initiated before the online session is begun. Call forwarding subscriptions are network-actuated, and thus, the forwarding options selectable by the user are typically limited to conserve network resources. Oftentimes, the user must be connected to the Internet using the telephone line to be monitored to use such ICW services. If the user chooses to answer the call, the remote server forwards the call back to the user's directory number. The user must then answer the call using the subscriber line monitored by the ICW. Some ICW systems place the Internet connection "on hold" for at least a short period of time (anywhere from 2 to 30 seconds), while the user answers the call. If the conversation or transmission is completed before the Internet connection is disconnected by the host or carrier, then the session can continue. If the user fails to respond to an onscreen cue, the ICW system must handle the call according to a default call-handling option.

In addition to potentially costly subscription services, existing ICW approaches require access to the subscriber line for activation and deactivation. This limitation restricts the number of lines that can be monitored using a computer or a caller ID device, because without additional equipment, most PCs and caller ID devices include only one or two incoming subscriber line jacks.

There is a need for a system and method for enabling a user to monitor one or more subscriber lines from any location, to identify the source of incoming calls, and to handle incoming calls accordingly.

SUMMARY OF THE INVENTION

The systems and methods of the present invention address the problems mentioned above by providing a caller identification, call treatment, and telephone line monitoring service that can be accessed from any computer that has Internet access (the "monitoring computer"). No subscriber features or customer interaction are required to handle each incoming call. Rather, an automatic configurable PSTN call-handling (CPC) service is implemented according to the characteristics of the incoming call. The decision to apply a particular call-handling option is moved from the PSTN to a user's computer, thereby reducing the limitations imposed by network-implemented subscriber services.

The CPC service has the advantage of delivering call notification information over a high speed connection, such as ADSL, directly to the users PC. The user's PC runs a CPC client program that includes, software with symmetric encryption that is also stored in a secure Customer Profile Dataserver (DS). The CPC client program is preferably enabled by placing a call to a special number from the user's primary telephone, similar to the process done to enable credit cards. Once enabled, the CPC client program can enable monitoring by registering the PC with a CPC Gateway Interface, by supplying the IP address of the user's PC. Authentication of the registration session utilizes symmetric encryption. The user can receive notification information from any PC that has access to the CPC client program. The last PC registered receives the notification information. If a different PC is already registered, it will receive a message indicating it no longer will receive notification information.

Once registered, the PC will receive encrypted notification information from the telephone network via the CPC Gateway interface and can respond with an appropriate call-handling option.

The CPC service allows a user to monitor incoming calls to multiple phone lines from any location that has Internet access. Thus, a user at an office can monitor telephone calls made to a home directory number. The CPC service also allows a user to handle the calls in predetermined ways based on information related to the characteristics of the call, such as the caller's directory number or name, the time, day, or date the call is received, or the user's decision at the time the call is received.

Generally described, certain embodiments of the present invention involve a method for handling calls received by a user of a subscriber line that is associated with a directory number. To initiate a CPC session, the user launches a CPC Client Program and/or accesses a CPC Gateway Interface, which sends registration information via an Internet connection. The registration information includes a network address associated with the user, such as an IP address, and a user identifier. The PSTN stores the IP address in a customer profile dataserver, which may be a part of an ICW database. The PSTN uses the IP address to send the user information identifying the source of an incoming call. The Customer Profile Dataserver may retain the IP address until a new IP address is sent by the user, for a predetermined amount of time, or until the session is terminated by the user.

The PSTN sends call information to the user via an Internet connection. Based upon the characteristics of the call information, the user or the CPC Client Program determines the desired call-handling option to be implemented. If a telephone call is placed to the user's directory number after a CPC session has been initiated, then an event descriptor is transmitted to the IP address stored in the customer profile dataserver. The event descriptor can include caller identification information, such as the caller's directory number or name, as well as circumstantial data, such as the date, time, or number of attempts. Receipt of this transmission causes a graphical user interface (GUI) to display call information based upon the event descriptor. The GUI also includes controls for selecting call-handling options. At this point, the incoming call can be handled in one of two ways. The user may have previously used the GUI to configure the CPC Client Program. The CPC Client Program is configured by associating call-handling options with various event descriptors, and by storing those associations in a local database. If the event descriptor received corresponds to a record in the local database, then the associated call-handling option is implemented. Alternatively, if the user is actively monitoring the directory number, the user can interact with the GUI to select a call-handling option to be implemented. The user can thereby supplement and/or override preselected associations between event descriptors and call-handling options.

Once manually selected by the user or automatically selected according to the associations created by the user, the desired call-handling option is sent to the PSTN, which handles the telephone call according to the selected call-handling option.

An aspect of certain embodiments of the CPC is a secure registration protocol. The registration information sent by the user to initiate a CPC session includes a user identifier. When the registration information is received, the user is preferably prompted for a password, which must correspond to the user identifier for the session to be authenticated. The secure registration protocol may also require the exchange of at least one encryption key. The encryption key may be used to encrypt and/or decrypt all or part of the registration information. Registration information can be sent either using the GUI, or via a web site hosted by the provider of the CPC service. The registration process must be completed before the user can monitor incoming calls or actively select call-handling options.

The CPC client program is stored on a computer-readable medium such as a hard drive of a computer, or a compact disc (CD). The CPC client program includes executable instructions that provide a graphical user interface (GUI) for the user of the subscriber line. The CPC client program GUI may include a call log that stores a history of incoming calls to the subscriber, including call characteristics and various call handling options implemented by the CPC client program in response to receipt of the call.

The CPC client program resides on the user's PC, and is preferably initially downloaded from a secure web site. However, in certain embodiments some functional components of the CPC client program may also be implemented via a web site hosted by the CPC provider, which may be accessed by the CPC client program. In certain other embodiments, some of these functional components may also be accessed via a standard Internet browser.

Several options for handling incoming calls are made available to the user via the CPC service. For instance, the user can select an option that causes a prerecorded message to a particular caller, as well as another option that causes the call to be forwarded to another directory number. The user can select from call-handling options including answering the call, placing the call on hold, routing the call to voicemail, ignoring the call, and forwarding the call to a forwarding directory number. The user is presented with these options when setting up the CPC Client Program, and/or each time a call is received.

Upon receiving notification of an incoming call having a characteristic that corresponds to a particular caller or class of callers, the selected call-handling options are transmitted to a CPC application service control point (SCP). The CPC Application implements at least a portion of the call-handling instructions, including network-actuated instructions such as call forwarding.

Certain embodiments of the system allow the user to preselect the desired call-handling options by configuring the CPC Client Program. Configuration is accomplished using the GUI by associating characteristics of incoming calls with at least one call-handling option. The associations are stored in a database that preferably resides on the user's PC. Preselecting call-handling options allows the user to handle multiple calls having a given characteristic in the same manner, without having to actively monitor and interact with the GUI.

A user may for example route all calls from family members to a personal line at the office and all other calls to a different line.

In certain embodiments of the invention, the user can configure the CPC Client Program to answer incoming calls with prerecorded and/or preselected audible messages. For example, the CPC Client Program automatically plays a formal message for an incoming call associated with a business contact and a casual message for a family member. For very specific messages, the user can establish a start and an expiration time or date. This feature is useful if the user wants to play a message to a certain caller while the user is unreachable for a short period of time.

A user may decide at the time the call is received to personally answer the call. Because monitoring occurs over an Internet connection, the user can also answer the call using a technology such as Voice over IP (VoIP). For example, a user at work could monitor calls to a home phone number and answer selected calls from work using VoIP. As another example, a user at a hotel could use a local ISP (internet service provider) to monitor and place calls using VoIP, without incurring long distance charges.

Yet another aspect of certain embodiments of the invention enables the user to monitor multiple lines simultaneously from one monitoring computer. The monitoring computer may be connected to the Internet via an Internet connection that is completely independent of the subscriber line. Unlike previous caller identification services that monitor only one phone number, the CPC service enables the user to monitor multiple phone lines from any desired location. Thus, a user can monitor home, office, and other phone lines while on the road as long as the user has access to an Internet connection.

Certain embodiments of the invention also allow a user to receive unique notifications for each incoming call. This notification includes both audio and visual prompts. This allows the user to display the incoming caller's picture for easy identification. A user could use audio prompts to play a favorite song for desired callers and a warning sound for undesired calls.

The various aspects of the present invention may be more clearly understood and appreciated from a review of the following detailed description of the disclosed embodiments and by reference to the appended drawings and claims.

BRIEF DESCRIPTION OF THE DRAWINGS

FIG. 8 is an illustration of an exemplary call log according to certain embodiments of the invention.

FIG. 13 is a flow diagram that illustrates an exemplary registration session according to certain embodiments of the invention.

FIG. 14 is a flow diagram that illustrates an exemplary call notification according to certain embodiments of the invention.

DETAILED DESCRIPTION

Figure 1:
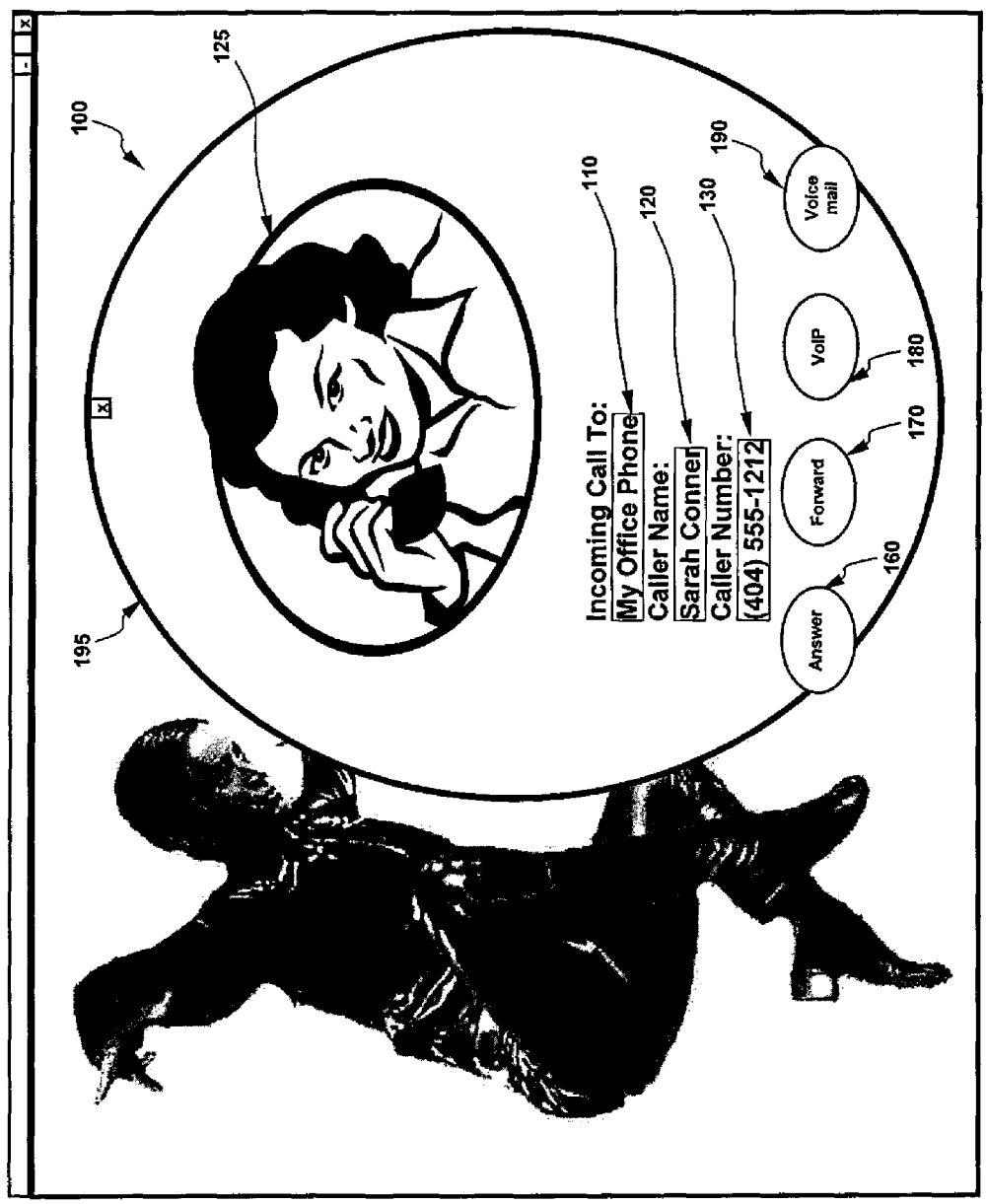
FIG. 1 is an illustration of an exemplary call notification window that includes a graphical user interface for notifying the user of incoming calls, according to certain embodiments of the invention.

The present invention is typically embodied in a configurable PSTN call-handling (CPC) service offered by a telecommunications company to a user who is also telephone service subscriber. Generally, the CPC service allows the user to implement almost unlimited permutations of call-handling rules, based upon the characteristics of the incoming calls. The CPC service uses the Internet to monitor one or more subscriber lines, each associated with a directory number that is assigned to the user. The characteristics of incoming calls are communicated to the user and/or the user's PC via the Internet. The user can actively respond to incoming calls by selecting and transmitting call-handling selections to the communications network. Alternatively, the user can configure a CPC Client Program to respond to the incoming calls by implementing preselected call-handling options.

The CPC service is particularly useful in combination with an ICW system such as the system described in U.S. patent application Ser. No. 09/440,403, entitled "Internet Call Waiting," which is hereby incorporated by reference.

One skilled in the art should recognize that the present invention can be generalized to embodiments in which a different computer network replaces the Internet. In such an embodiment, the telephone network uses a computer network to notify a user of a subscriber line associated with a directory number that a caller has placed a telephone call to the directory number, while a CPC Client Program on the user's PC is activated and/or while the user is logged onto the computer network.

Turning now to the figures, in which like numerals refer to like elements throughout the several figures, aspects of typical embodiments of the present invention will be described.

Graphical User Interfaces for Implementing the CPC Service

FIGS. 1-9 illustrate what the user sees and does in a typical implementation of the CPC service. Each of the windows shown in FIGS. 1-9 is an example of the various graphical user interfaces that enable the CPC service to communicate with the user, and with elements of the telephone network, thereby enabling the various features of the CPC service. Typically, the graphical user interfaces are controlled by a CPC Client Program running on the user's computer. Alternatively, the graphical user interfaces can generated over the Internet by the CPC service provider, and can interface with the CPC Client Program running on the computer.

The graphical user interfaces allow the CPC Client Program to provide information to the user about telephone calls to the directory number while the user is connected to the Internet using the subscriber line or using any other wireline or wireless Internet connection from any location. The graphical user interfaces further permit the CPC Client Program to receive information from the user regarding the user's desired dispositions of these calls. The user interacts with the graphical user interfaces to select desired call-handling options. The CPC Client Program communicates with the telephone network over a high-speed connection, such as ADSL, in order to receive incoming call information and to instruct the telephone network to handle an incoming call in accordance with the user's selection of call-handling options.

Figure 2:
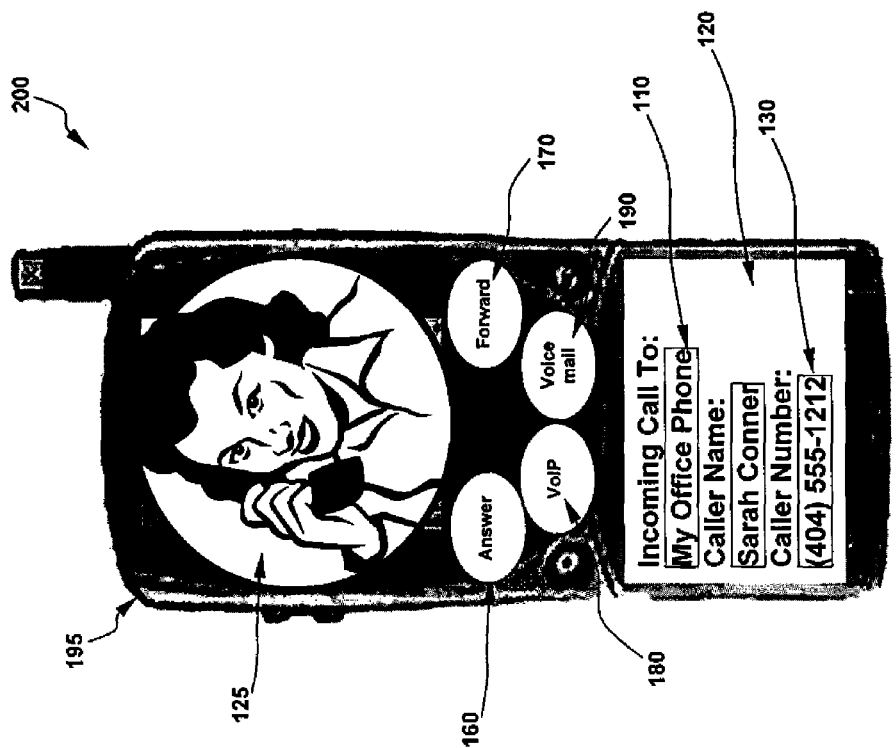
FIG. 2 is an illustration of another exemplary call notification window that includes a graphical user interface for notifying the user of incoming calls, according to certain embodiments of the invention.

FIG. 1 and FIG. 2 illustrate aspects of various embodiments of call notification windows 100 and 200, which the CPC Client Program displays to the user upon notification that a caller has placed a telephone call to the directory number associated with a subscriber line that is presently monitored by the user. The call notification windows 100 and 200 display a monitored line field 110 to identify the directory number of the monitored subscriber line (monitored DN). The call notification windows 100 and 200 include a name of caller field 120, which indicates that the caller is Sarah Conner. A caller image 125 may also be displayed. The caller image 125 can be a stored image file that is associated with that particular caller, or can be received as additional call data. The call notification windows 100 and 200 also include a caller directory number (caller DN) field 130, which indicates that the telephone number of the caller is 404-555-1212 in the example of FIG. 1. The call notification windows 100 and 200 may further include a date of call field 140 (not shown) and a time of call field 150 (not shown).

Each call notification window 100 or 200 includes a graphical theme commonly known as a "skin" 195. The skin 195 may include pictures, graphics, colors, icons, click sounds, and any other visible and audible element that defines the look and feel of a particular GUI. The CPC Client Program 1030 includes a utility that allows the user to select from various skins for the call notification windows 100 and 200, as well as for the entire CPC Client Program. The call notification windows shown in FIG. 1 and FIG. 2 are merely examples of the innumerable variations of appearance and functionality of a call notification window.

Certain embodiments of the call notification window 100 include one or more of call disposition buttons 160, 170, 180, and 190, as shown in FIG. 1 and FIG. 2. Call disposition buttons provide the user with the opportunity to instruct the telephone network 1090 how to process the telephone call. The CPC Client Program provides the user with a limited amount of time to select one of the buttons 160, 170, 180, and 190. If the user fails to make a button selection within the time limit, then the CPC Client Program instructs the telephone network to dispose of the telephone call in a default manner, such as sending the call to a voice mailbox associated with the directory number the caller called, ignoring the call by providing a busy signal or letting the call ring, or forwarding the call to a predetermined number. If the caller terminates the call before either the time limit has expired or the user has selected a call disposition option, the CPC Client Program replaces the call notification window 100 with a message that the user should check the call log window 400 of FIG. 4 because the user missed a telephone call.

If the user selects the answer button 160, the CPC Client Program 1030 instructs the telephone network 1090 to connect the call to the user. The call can be answered in one of at least two ways. The user can pick up a handset connected to the monitored subscriber line. Alternatively, the user can answer the call via Internet telephony. Internet telephony enables the user to conduct voice conversations over a data network using the Internet Protocol, such as an application such as a Voice over IP (VoIP) client. Systems and methods for integrating the Internet Protocol with the SS7-based telephone system are known, and will not be described in detail.

The selection by the user of the other buttons 170, 180, and 190 instructs the CPC Client Program to dispose of the call in a manner other than immediately connecting the call through to the user, thereby allowing the user to continue an Internet session or other activity. Selection of the call forward button 170 instructs the CPC Client Program to display the call forwarding options selected using the call forwarding portion 460 of the monitoring and configuration window 400 of FIG. 4. A blank field may also be displayed to allow the user to forward "on the fly" by inputting a new forwarding number. Selection of a hold button (not shown) leaves the telephone call on hold and causes the CPC Client Program to display a call holding information window (not shown). Selection of the VoIP button 180 causes the call to be answered using Voice over IP (as described in more detail below). Selection of the voice mail button 190 instructs the CPC Client Program to direct the telephone network to route the call to a voice mailbox. Alternatively, for the VoIP, a greeting window (not shown) may allow the user to specify the prerecorded greeting that the CPC Client Program will play for the caller and subsequently to record the message into a sound file on the users PC. Alternatively, the greeting window may prompt the user to record a very brief message to be immediately played for the caller (for example "I'm online right now, Jim, but come on over"). Selection of an ignore button (not shown) may alternatively cause the telephone network to give the caller a busy signal or let the caller hear a ring until the caller terminates the call.

Placing a call on hold preferably causes the CPC Client Program to instruct the telephone network to play a message notifying the caller that the user has placed the caller on hold. The call holding information window includes a holding time field, which indicates how long the caller has been holding. The call holding information window may also indicate the name and the telephone number of the caller who is on hold. Upon displaying the call holding information window and notifying the telephone network to place the call on hold, the GPC Client Program may provide the user with a limited amount of time to press the answer button in order to answer the call.

If the user fails to press the answer button within the time limit, then the CPC Client Program instructs the telephone network to use a default call disposal option, such as sending the call to voice mail, ignoring the call, or forwarding the call to a predetermined number. If the caller hangs up before either the time limit has expired or the user has pressed the answer button, then the CPC Client Program replaces the call holding window with a message that the user should check the call log because the caller ended the call. If the user chooses the answer button before the time limit expires and before the caller ends the call, then the CPC Client Program instructs the telephone network to connect the call to the user through the subscriber line, or connects the call using VoIP.

Figure 4:
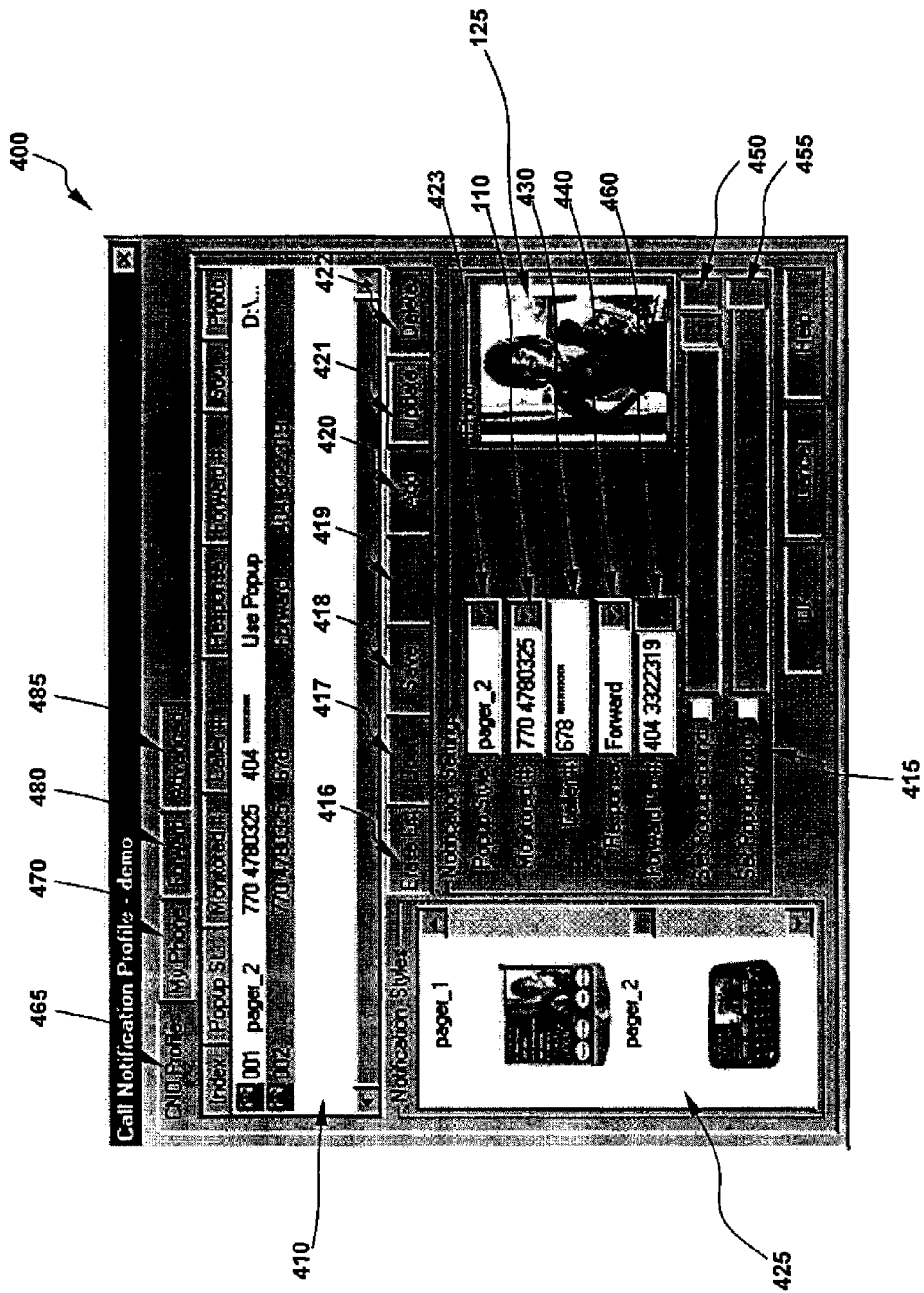
FIG. 4 is an illustration of an exemplary monitoring and configuration window, according to certain embodiments of the invention.
Figure 7:
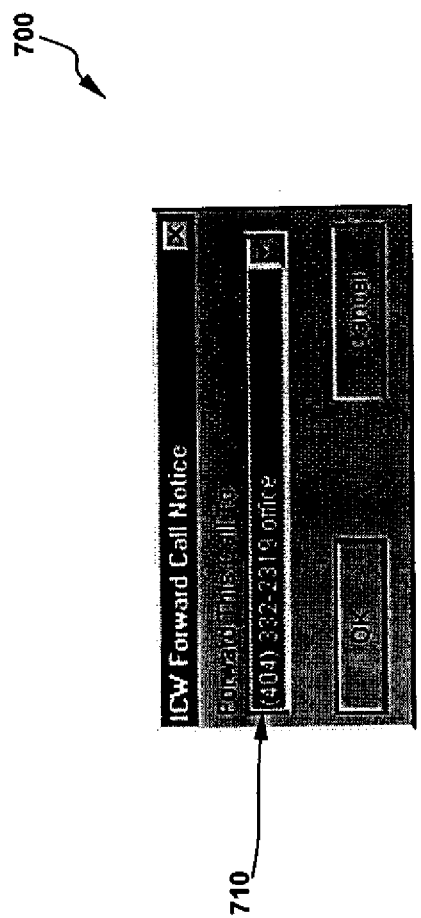
FIG. 7 is an illustration of an exemplary call forwarding options utility according to certain embodiments of the invention.
Figure 9:
FIG. 9 is an illustration of an exemplary caller ID utility according to certain embodiments of the invention.

By pressing the call forward button 170 in the call notification window 100, the user instructs the CPC Client Program to display at least the call forwarding options selected using the configuration window 400 of FIG. 4 to the user. The call forwarding options are displayed as a list of telephone number entries (an example of which is shown in FIG. 7) identifying telephone numbers to which the user can choose to forward the call. Each telephone number entry contains a telephone number indicating a directory number to which the user can forward the call and a name providing further identification information for the telephone number in the corresponding number column of the telephone number entry. For example, the name may indicate the person or entity associated with the forwarding directory number (forwarding DN).

If the user presses a "cancel" button, the CPC Client Program replaces the call forwarding options window with the call notification window 100 so that the user can select a different call-handling option.

If, on the other hand, the user selects a telephone number entry then the CPC Client Program may highlight that entry. By pressing the "OK" button, the user instructs the CPC Client Program to forward the pending call to the highlighted forwarding DN. The CPC Client Program, in turn, supplies the forwarding DN to the telephone network as to proper destination for the telephone call. In comparison to subscription call forwarding services in which the SCP queries a network database to determine the appropriate forwarding DN, this aspect of the invention performs call forwarding at the PC level.

As with the windows 100 and 200, the CPC Client Program may provide the user with only a limited amount of time to press a button on the call forwarding options dialog. If the user fails to press a call forwarding button within the time limit, then the CPC Client Program provides a default call-handling option to the telephone network. If the caller hangs up before either the time limit has expired or the user has pressed a button, then the CPC Client Program replaces the call forwarding options dialog with a message that the user should check the call log portion of the monitoring and configuration window 400 of FIG. 4 because the caller ended the call.

Figure 3:
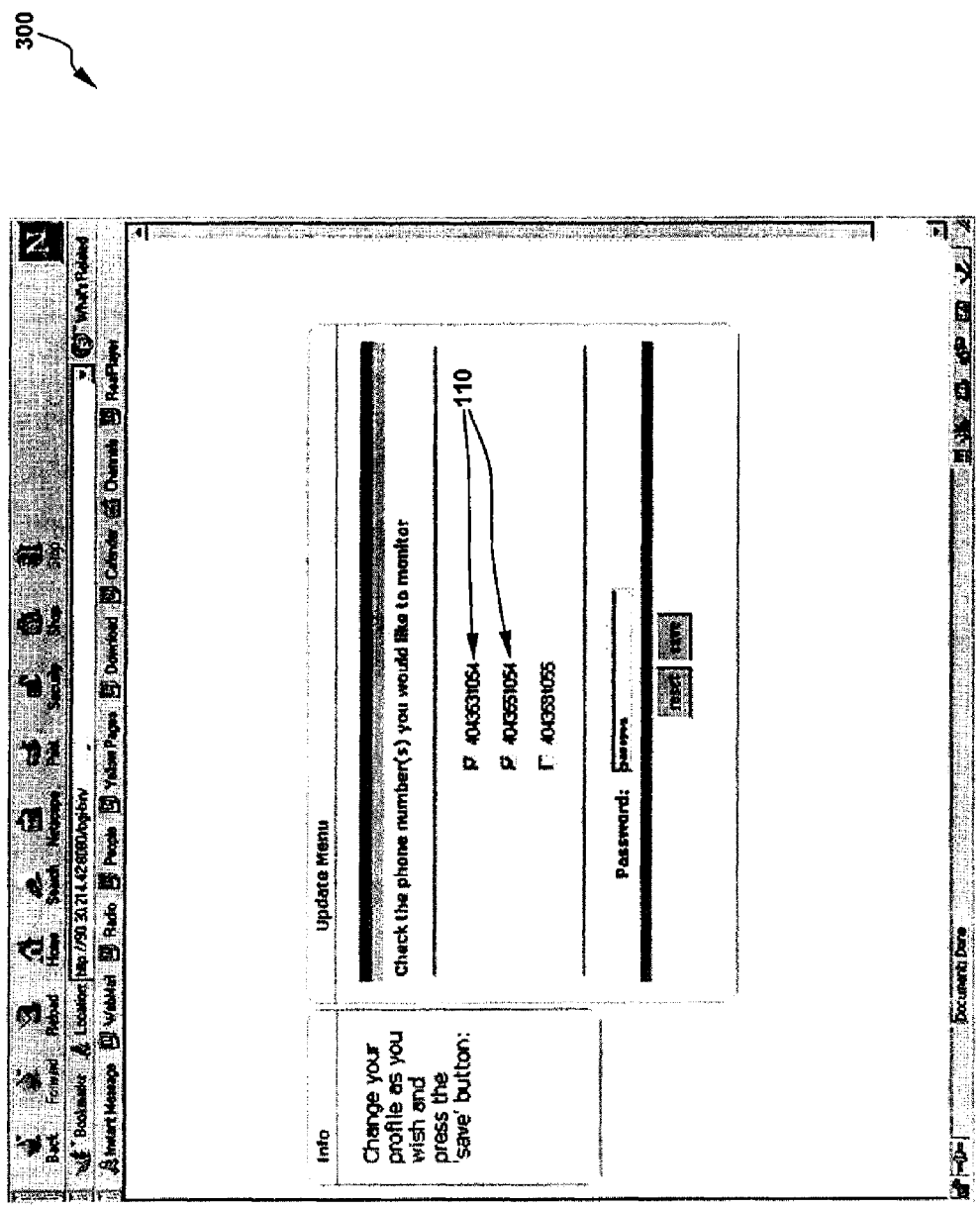
FIG. 3 is an illustration of an exemplary registration dialog window, according to certain embodiments of the invention.

FIG. 3 is an illustration of an exemplary registration dialog window 300, according to certain embodiments of the invention. The registration dialog window 300 can be a component of the CPC Client Program, or can be a component of a web site hosted by the CPC provider. As part of the registration process, the registration dialog window 300 allows the user to elect to monitor any or all of the subscriber lines associated with the user. A list of available subscriber lines is retrieved from the customer profile dataserver, based upon the user identifier provided by the user. The registration dialog window 300 can also prompt the user for a password, which can be used to authenticate the user for the CPC service, as described in more detail below.

FIG. 4 illustrates an exemplary monitoring and configuration window 400 for displaying the dispositions of telephone calls received by the user. It should be understood that the monitoring and configuration window can include any or all of the elements described in a single interface with or without tabs, or can provide access to the elements through a series of nested windows.

The monitoring and configuration window 400 includes a call disposition profile log 410 that contains call-handling associations. Each call-handling association indicates a predetermined call-handling protocol associated with calls having a given set of characteristics. In the embodiment shown, for example, the user has created two call disposition profiles. Call-handling association 001 applies to calls received by monitoring number (770) 478-0325, and having the characteristic of being placed from area code 404. Call-handling association 001 responds to such calls by notifying the user using a popup window having popup style "pager_2." The popup window also displays and image that is retrieved from the user's hard drive D:\. Call-handling association 002 applies to calls received by monitoring number (770) 478-0325, and having the characteristic of being placed from area code 678. Call-handling association 001 responds to such calls by forwarding the calls to forwarding DN (404) 332-2319.

In certain embodiments, the call disposition profile log 410 also includes buttons for managing the call-handling associations. More specifically, the user can delete all call-handling associations by selecting the "Erase All" button 416, and can create a new call-handling association by selecting the "Add" button 420.

To add a new call-handling association, the monitoring and configuration window 400 includes a call-handling configuration utility 415, which may be an element or a child window of a calling number display (CND) profile utility 465. The call-handling configuration utility 415 enables the user to easily define associations between call characteristics and call-handling options. For instance, the call-handling configuration utility 415 shown permits the user to associate calls received with desired call-handling options, where the calls were received on a given monitored DN and have certain characteristics, such as caller DN, caller name, or caller area code. The user then selects the combination of incoming call characteristics for which a particular call-handling option is desired. As shown, the configuration utility 415 allows a call-handling option to be associated with a caller DN as entered in the "caller#" field 430. For an incoming call having the specified caller DN, the user may choose to view the call information using a call notification window 100 having a particular skin. The skin may be chosen using the dropdown "popup style" field 423 or by clicking on one of several variations of call notification windows 100 shown in the scrolling "notification styles" box 425. The user also selects a particular call-handling option from dropdown "response" field 430. The user uses the "set popup sound" field 450 to select a predefined or prerecorded sound file, or the "set popup photo" field 455 to select predefined graphics or photographs for presentation when a call is received from the specified caller. If the user wants all calls from the specified caller to be forwarded to a particular forwarding DN, the forwarding DN is entered in the "forward" field 460. All of these selections create a call-handling association that can be managed using the CND profile utility 465. The user can save a call-handling association using the "Save" button 418, or the "Update" button 421 (if the record is preexisting). Each call-handling association is stored in a local database that resides in a memory element of the user's PC. Existing call-handling associations can be opened using the "Open" button 417, copied using the "Save As" button 419, and deleted using the "Delete" button 422. Call-handling associations may vary even for the same caller according to the monitored DN selected using the "monitored #" field 110, or according to the day, time, date, or line condition (e.g., busy, idle). In response to the user pressing a print button, the CPC Client Program 1030 prints all or part of the call disposition profile log 410 to a printer. By pressing a delete button, the user can delete one or more single call disposition entries that the user has previously selected and highlighted. By pressing a "hide" button, the user can hide the call disposition profile log 410.

Figure 5:
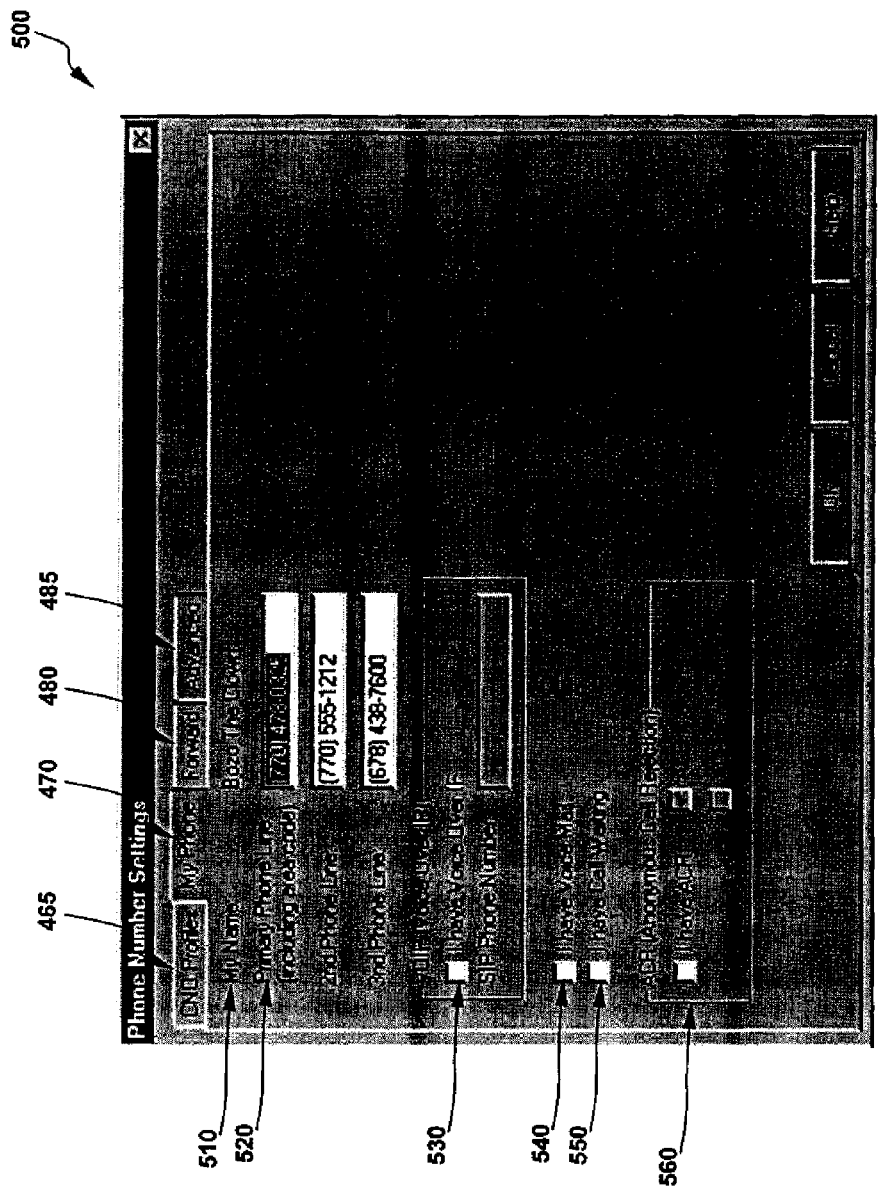
FIG. 5 is an illustration of an exemplary personalization window according to certain embodiments of the invention.

The monitoring and configuration window 400 may include a personalization window 500 such as the "My Phone" utility 470 shown in FIG. 5. The personalization window 500 enables the user to indicate certain preferences, and the availability of certain services. For instance, field 510 displays a display name that identifies the user. Field 520 enables the user to assign a priority to each monitored phone line, such as by applying a designation such as "primary phone line." Field 530 enables the user to indicate the availability of VoIP. Preferably, field 530 must be checked in order to access VoIP button 180. Similarly, field 540 preferably must be checked to enable voicemail button 190. Field 550 indicates whether the user subscribes to a call waiting service.

Field 560 enables the user to indicate whether the user subscribes to an anonymous call rejection service. Alternatively, field 560 may direct the CPC Client Program to reject incoming calls for which caller identification information is unavailable.

Figure 6:
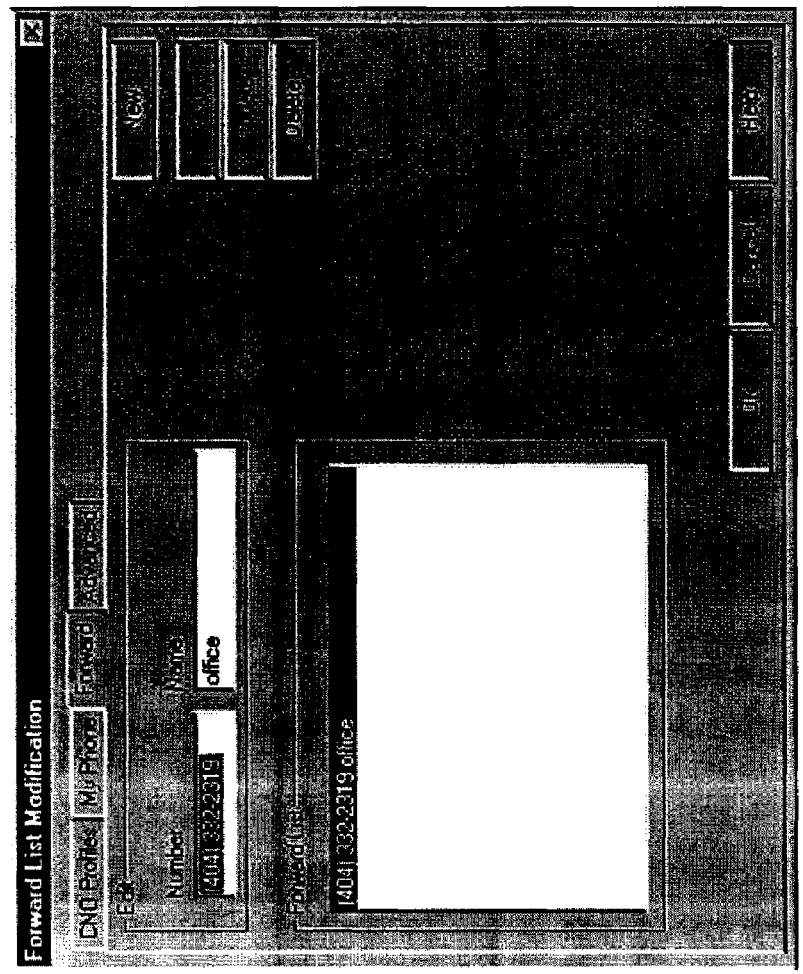
FIG. 6 is an illustration of an exemplary call forwarding utility according to certain embodiments of the invention.

To facilitate a wide range of forwarding options, the monitoring and configuration window 400 may include a call forwarding tab 480. As shown in FIG. 6, the call forwarding utility 600 can include a number of fields and controls that enable the user to build a call forwarding list that includes frequently used forwarding DNs. The call forwarding list can be used to forward incoming calls upon receipt, and to configure a custom call-forwarding schedule. The call forwarding list built using the call forwarding utility 600 is displayed in the call forwarding options utility 700 shown in FIG. 7. The call forwarding options utility 700 becomes available to the user whenever the user is prompted to choose from the call forwarding list, such as in response to the selection of the forward button 170 upon notification of an incoming call. By selecting forwarding DN using forwarding DN field 710, the user can forward incoming calls to different forwarding DNs "on the fly."

The call-forwarding schedule can designate certain times, days, and dates on which the customer wants to start or end forwarding of all or some telephone calls. For instance, the user may want all calls to be forwarded to a remote voice mailbox during the user's usual weekday working hours of 9 a.m. to 6 p.m., with the exception of calls from the user's mother. The call-forwarding schedule may exempt calls having a caller DN or caller name that corresponds to the user's mother, forwarding those calls to the user's work telephone instead. To implement call-handling options according to a caller name, the configuration utility may incorporate a flexible matching protocol. Flexible matching can enable the user to associate a particular call-handling option with, for instance, any call associated with a caller name that includes "Smith."

The call log 800 is shown in FIG. 8. Each entry in the call log 800 corresponds to a single telephone call placed to the user while the CPC Client Program 1030 monitored the corresponding subscriber line. The CPC Client Program 1030 may impose a limit on the number of entries that can be displayed and/or stored. The limit may be configurable by the user. Each entry in the call log 800 includes any of a number of data elements, each data element being displayed in a column. The data elements and columns displayed can be configured by the user using any of several known methods for configuring a GUI, such as by using a "field chooser" (not shown) to select certain columns from a predefined set of available columns, and/or by formatting the content of each column. As examples, the call log 800 may include a time column indicating the time of the call, a date column indicating the date of the call, a caller name column indicating the name or description of the caller, a caller phone column indicating the directory number of the caller, a call status column indicating the call-handling option that was applied to the call, and a number called column indicating the monitored DN to which the call was placed. The CPC Client Program 1030 updates the call log 800 every time the CPC Client Program 1030 processes a new incoming call. The call log 800 may also display outgoing calls placed from any of the monitored subscriber lines.

The call log 800 can be accessed via an onscreen caller ID utility 900 that summarizes call log activity, such as summarizing calls received since the call log 800 was last viewed. The caller ID utility may display a count of missed calls, disconnected calls, and calls for which the user exhausted the time allotted to select a call disposition option. The caller ID window 900 may also allow the user to scroll through basic information about calls received, such as the caller DN, and date and time the call was placed.

Thus, FIGS. 1-9 illustrate exemplary graphical user interfaces for communicating the desired and actual disposition and the characteristics of telephone calls placed to the user. One skilled in the art should recognize that different graphical user interfaces could be used to implement the present invention. Similarly, the CPC service could communicate with the user through a means of notification other than a graphical user interface for a computer system. For example, the CPC service could communicate with the user through a computer peripheral that emits an alarm when there is an incoming call and permits the user to answer the call by pressing a physical button on the computer peripheral.

Exemplary CPC Operating Environment

Figure 10:
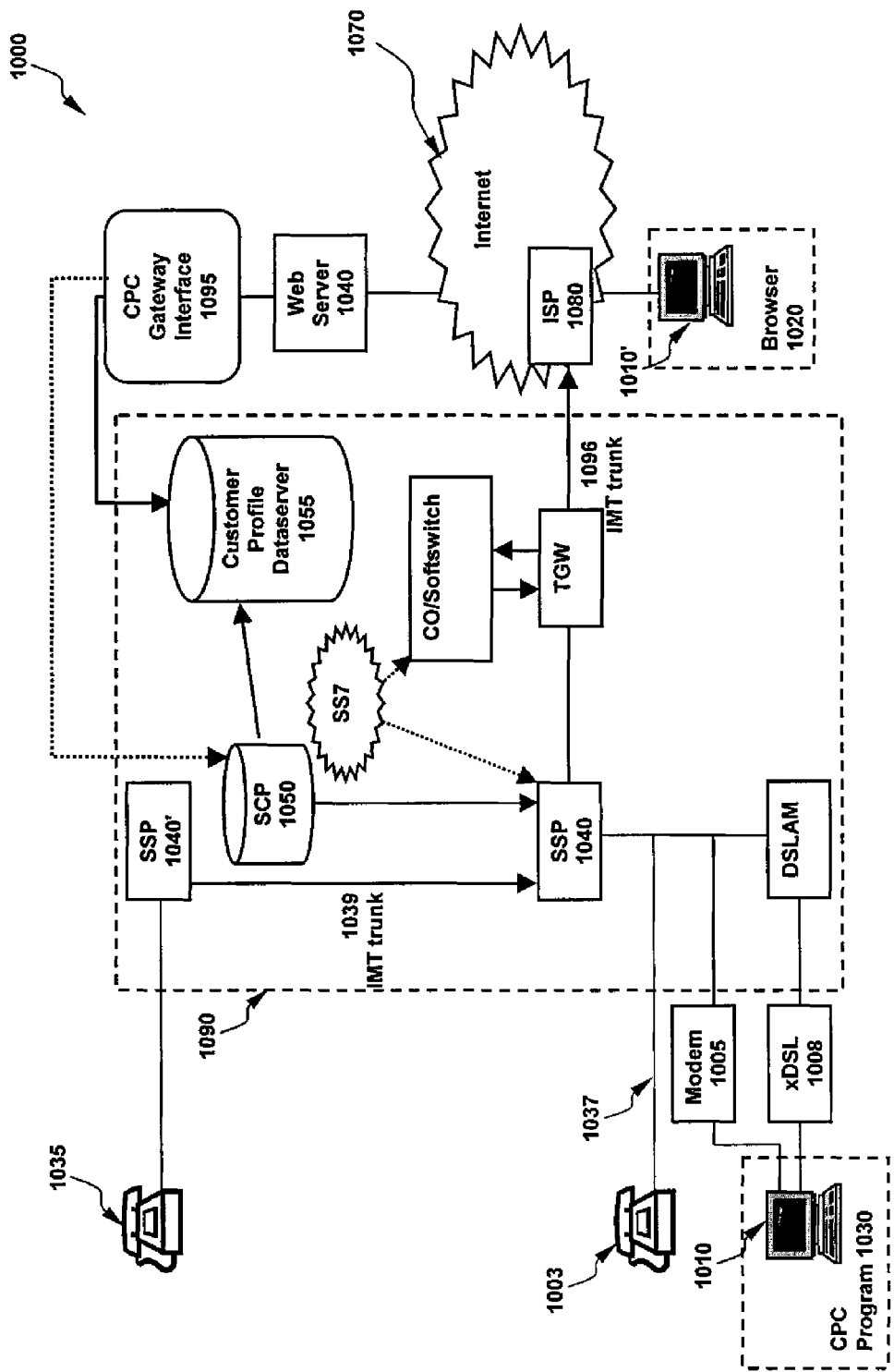
FIG. 10 is block diagram of an exemplary CPC environment, according to certain embodiments of the invention.

FIG. 10 illustrates the operating environment 1000 for a typical implementation of the CPC service. Typically, a public switched telecommunications network (PSTN) provides the infrastructure for telephone service. A PSTN typically includes an Advanced Intelligent Network (AIN). A representative portion 1090 of an AIN is shown in FIG. 10. The AIN 1090 is well known to those skilled in the art and is described in U.S. Pat. No. 10,438,568 to Weisser, Jr., which is incorporated by reference.

The AIN 1090 includes a central office (CO) or a softswitch equipped with a service switching point (SSP) 1040. The terms "SSP" and "switch" may be used interchangeably herein. An SSP 1040 typically connects many voice channel circuits, such as the subscriber line 1037, with the rest of the PSTN.

Typically, a subscriber line such as the subscriber line 1037 carries telecommunications service between the home or office of a subscriber to the rest of the PSTN. The subscriber line 1037 may be connected to the rest of the PSTN through the SSP 1040. The user may attach various known telecommunications equipment to the subscriber line 1037, such as a telephone 1003 and an analog modem 1005 or ADSL modem 1005 connected to a computer 1010. Other types of communications devices may be connected to the user's computer 1010, such as a cable modem or a wireless modem.

At least one directory number, more commonly referred to as a telephone number, is assigned to each subscriber line. To call the user of a subscriber line, a caller dials a directory number associated with the user's subscriber line 1037, and the PSTN connects the call using various call routing procedures known to those skilled in the art.

In FIG. 10, the connection 1039 links a telephone 1035 of the caller who wishes to place a telephone call to the user's telephone. The connection 1039 may be any connection, such as an intermachine trunk (IMT), that connects the caller's SSP 1040' with the user's SSP 1040. It should be appreciated that the connection 1039 may comprise a complicated pathway involving multiple voice channel links and switches.

Generally, the SSP 1040 is configured to recognize a trigger, which is a predetermined set of conditions associated with a telephone call that has been routed through the SSP. A trigger serves as an indicator for the SSP 1040 to take certain action. When the SSP 1040 detects a trigger, the SSP 1040 may temporarily suspend routing of the call in order to query another network component for instructions on how to proceed. Upon receiving instructions in response to the query, the SSP 1040 routes the call in accordance with the instructions.

For example, the SSP 1040 may query a service control point (SCP), such as the SCP 1050, for call routing instructions upon detecting a trigger. Communication between the SSP 1040 and the SCP 1050 may be carried by a data link 1096.

Various triggers are known to those skilled in the art. For example, the SSP 1040 may be programmed to recognize a TAT trigger, which occurs every time a call to the subscribers directory number is routed to the SSP. Similarly, the SSP 1040 could be programmed to recognize a termination busy (TB) trigger. When the SSP 1040 receives a call directed to the subscriber's directory number, the SSP detects a TB trigger if the subscriber line 1037 associated with the subscriber's directory number is busy.

SCPs, such as the SCP 1050, provide much of the intelligence in the AIN 1090. The SCP 1050 is a remotely programmable intelligent network element. Like other SCPs, the SCP 1050 maintains a network of databases that are used in providing subscribers with advanced network functions, such as the CPC service. Specifically, the SCP 1050 interfaces with an CPC Customer Profile Dataserver 1055 that has records that correspond to CPC users. Each record indicates the IP address of the computer from which the user is currently connecting a monitoring computer 1010' to the Internet 1070. The monitoring computer may be the user's PC 1010 or any other computer that has access to the Internet. Thus, the CPC subscriber profile database maintains a current record that can be accessed to determine where to notify the user over the Internet 1070 of the status of the user's subscriber line.

The user's computer 1010 or 1010' may have typical features of a computer system, such as a processing unit, a system memory containing random access memory (RAM) and read only memory (ROM), and a system bus that couples the system memory to the processing unit. The computer may also include various memory storage devices, such as a hard disk drive, a magnetic disk drive (e.g., to read from or write to a removable magnetic disk), and an optical disk drive (e.g., to read from or write to optical media such as a CD-ROM).

A number of program modules may be stored in the drives and RAM of the computer system. Program modules control how the computer system functions and interacts with the user, with input/output devices, or with other computers. Program modules include routines, an operating system, application program modules, data structures, browsers, and other software or firmware components.

In a typical implementation of the CPC service, the user's computer 1010 or 1010' includes the following program modules: the Internet access program 1020 and the CPC Client Program 1030. As already described, the CPC Client Program 1030 provides access to the graphical user interfaces for notifying a user of the computer that there is an incoming call to the user's subscriber line. Furthermore, the CPC Client Program 1030 receives directions from the user for handling such an incoming telephone call and communicates these directions to the AIN 1090.

It should be understood that the user can monitor incoming calls using a computer 1010 that is connected to the subscriber line, or using a computer 1010' that is not connected to the subscriber line. In FIG. 10, therefore, the computer 1010 and the computer 1010' may be the same computer, and either or both computers can be a monitoring computer.

An Internet access program 1020, such as a web browser, enables the user to establish an Internet connection between the monitoring computer 1010' and the Internet 1070. To do so, the program 1020 may direct a computer modem connected to the computer 1010' to dial an Internet Service Provider (ISP) 1080, which serves as a gateway onto the Internet. The AIN 1090 routes the calf from the SSP 1040 to the ISP 1080 over the connection 1096, which may include a terminal gateway (TGW), multiple switches, and voice data links. Once the call is connected to the ISP 1080, the Internet access program 1020 establishes a PPP (point-to-point protocol) connection with the ISP. This PPP connection provides the computer with Internet access, and the computer user may then utilize various Internet applications.

No particular programming language will be described for carrying out the various procedures described in the detailed description because it is considered that the operations, steps, and procedures described and illustrated in the accompanying drawings are sufficiently disclosed to permit one of ordinary skill in the art to practice an exemplary embodiment of the present invention. Moreover, there are many computers and operating systems which may be used in practicing an exemplary embodiment, and therefore no detailed computer program could be provided which would be applicable to all of these many different systems. Each user of a particular computer will be aware of the language and tools which are most useful for that user's needs and purposes.

Registration

The user initiates each CPC session by registering over the computer network (preferably, the Internet). Registration occurs automatically, whenever the user accesses the CPC Gateway Interface directly via the Internet, or indirectly by launching the CPC Client Program. During registration, the registration information is received by the CPC Gateway Interface, including a network address that is associated with the user. The CPC Gateway Interface 1095 communicates with the SCP 1040. The network address is preferably an IP address that has been assigned to the user's Internet session.

The registration information also includes at least one directory number that is assigned to the user. The CPC Gateway Interface 1095 causes the registration information, including the derived TCP/IP address, to be associated with the user and stored as records in a Customer Profile Dataserver 1055. Each directory number defines a unique record in the Customer Profile Dataserver 1055. Thus, if a user provides multiple directory numbers during registration, then that user will receive call notifications in order to monitor calls involving each directory number.

Figure 11:
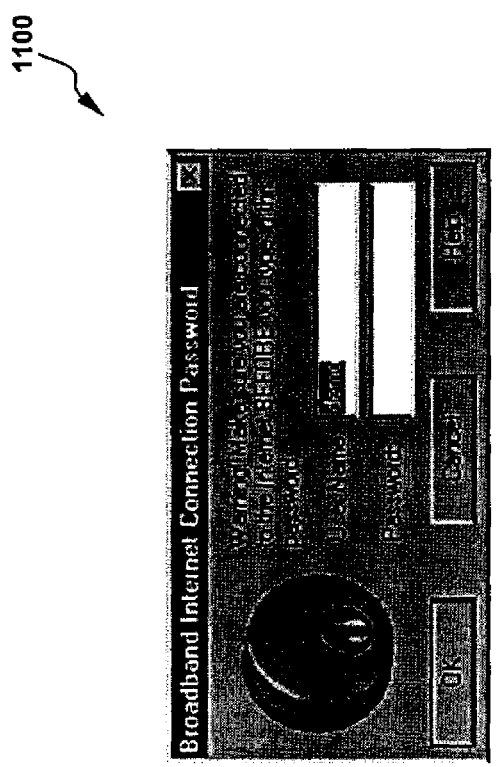
FIG. 11 is an illustration of an exemplary authentication screen according to certain embodiments of the invention.

If the user connects to the Internet using the monitored line, then the CPC Gateway Interface 1095 authenticates the user simply by matching the directory number associated with the Internet connection with the directory numbers stored in the Customer Profile Dataserver 1055. The CPC Gateway Interface 1095 then may allow monitoring and call-handling with respect to only that directory number. Alternatively, the CPC Gateway Interface 1095 can receive from the CPC Client Program, or retrieve from the customer profile dataserver, any other directory numbers associated with the user. However, the CPC Gateway Interface preferably authenticates the user's registration attempt using a suitable security protocol. In one embodiment, the security protocol is public key encryption. In another embodiment, the security protocol uses a digital envelope. In the authentication screen 1100 of the embodiment shown in FIG. 11, the user is authenticated at least in part by means of a user name and a password.

Figure 12:
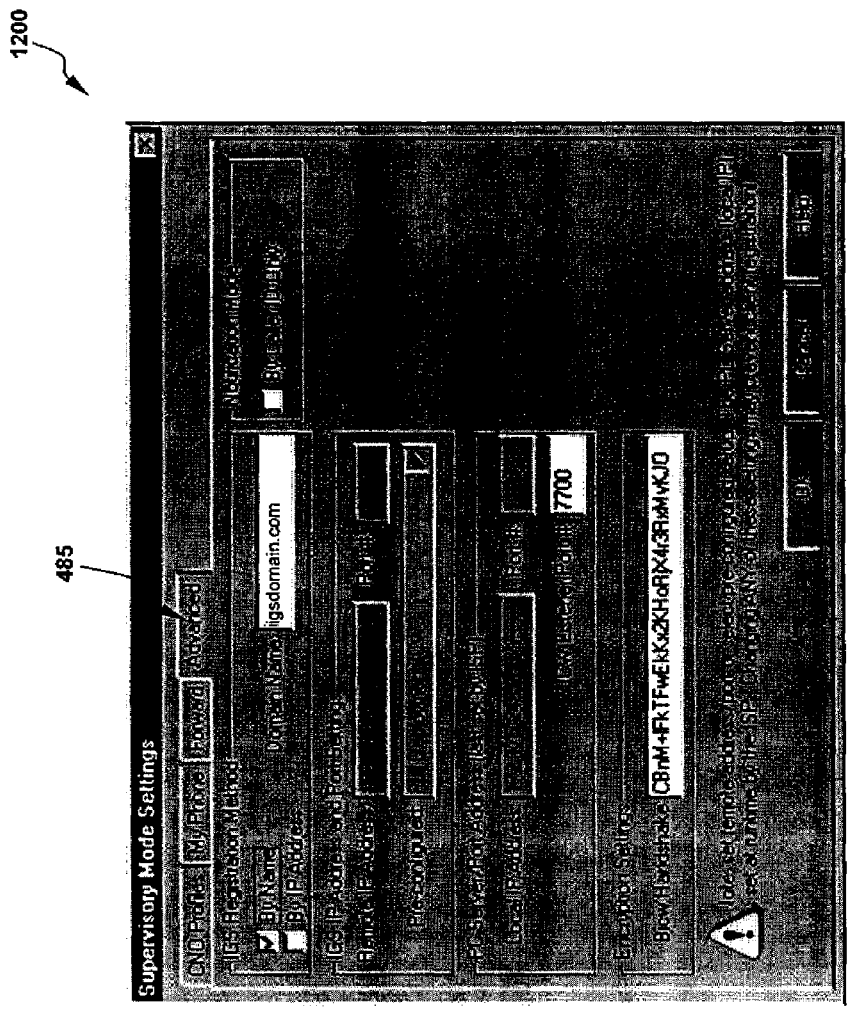
FIG. 12 is an illustration of an exemplary registration setup screen according to certain embodiments of the invention.

FIG. 12 is an exemplary registration setup screen 1200 according to certain embodiments of the invention. The registration setup screen 1200 enables the user to change default settings that control at least some aspects of the registration process. For instance, in the embodiment shown, the user can designate a registration method and web site, and a notification mode. The registration setup screen 1200 gives the user the ability to at least view and possibly, to alter local and remote IP addresses and port settings. The user may also be able to at least view and possibly, to alter encryption codes and other initial device data exchanges (such as handshakes). The registration setup screen 1200 is preferably accessible from the monitoring and configuration window 400 via an "Advanced" tab 485.

Registration is handled on a "last in, first out" basis. In other words, the last IP address supplied by the CPC Client Program is used as the users IP address until another IP address is provided, the IP address is expressly canceled by the CPC Client Program, or the IP address expires due to passage of time.

Alternatively, the AIN could periodically query the IP address supplied by the user to verity that the user is still logged onto the Internet, and then update the appropriate record in the Customer Profile Dataserver if the user is not still logged onto the Internet. As another alternative, the AIN could request immediate acknowledgement of any call notification message that the AIN sends to the CPC Client Program. If the AIN does not receive prompt acknowledgement, then the AIN can assume that the user is no longer logged onto the Internet, and the AIN can route the call accordingly.

FIG. 13 illustrates an exemplary message flow during a typical registration session according to certain embodiments of the invention. Prior to registration, the user PC requests a user password and creates a hash digest to ensure the integrity of data transfers. At 1302, the user's PC sends to the CPC Gateway Interface data that indicates the version of the CPC client program and the users DN in a handshake message. The CPC Gateway Interface verifies version compatibility. If the version is compatible, at 1304, the CPC Gateway Interface retrieves a password digest and an encryption key (the "pckey") that correspond to the DN from the Customer Profile Dataserver, and uses the pckey to encrypt a handshake acknowledgement message. The handshake acknowledgement message also contains a session key generated by the CPC Gateway Interface, at 1306. Then, at 1308, the handshake acknowledgement message is sent to the PC, which decrypts the message and switches to the session key. All further communications in the session are conducted using the session key. At 1310, the PC sends a "pcRegister" message to the CPC Gateway Interface, including the users password digest, DN, and IP address. The pcRegister message is encrypted using the session key. The CPC Gateway Interface uses to the session key to decrypt the pcRegister message, and proceeds to validate the session. At 1312, the CPC Gateway Interface verifies that the DN in the pcRegister message matches the DN sent in the handshake message. If the DNs do not match, an error is declared. At 1314, the CPC Gateway Interface verifies that the password digest is correct. If the password digest is incorrect, an error is declared and reported to the Customer Profile Dataserver, which updates the user's record, at 1316. If the CPC Gateway Interface validates the session, the CPC Gateway Interface establishes a communications session with the user by attempting to connect with the PC at 1318. At 1320, the CPC Gateway Interface sends a Test message to the PC. At 1324, the PC returns a test acknowledgement. At 1328, the CPC Gateway Interface prepares a message containing the IP address, session key, and a timestamp, and updates the Customer Profile Dataserver, at 1330. At 1332, the CPC Gateway Interface sends a registration acknowledgement to the PC. At 1334, the CPC Gateway Interface determines whether an "old" IP address was already associated with the PC in the Customer Profile Dataserver. If so, at 1336, the CPC Gateway Interface sends a message to the old IP address to clear any preexisting sessions.

CPC Call Handling

According to certain embodiments of the invention, the AIN 1090 handles a telephone call in an implementation of the CPC service as shown in FIG. 14. A caller initiates a telephone call from the caller's telephone 1035 to a directory number associated with the subscriber line 1037. The PSTN routes the call over the connection 1039 to the SSP 1040. Upon receiving the telephone call, the SSP 1040 detects a trigger, such as a TAT trigger or a TB trigger, and sends an SS7 query to the SCP 1050 over the data link 1096 to retrieve subscriber and routing information. The SS7 query includes the user's directory number and/or a user identifier, such as a customer ID.

In response to the query, the SCP 1050 searches the Customer Profile Dataserver 1055, which may be incorporated into the SCP, for a record identified by the user identifier and/or the directory number dialed by the caller. If the SCP 1050 fails to find such a record, then the user is not a subscriber to the CPC service. Accordingly, the SCP 1050 then directs the SSP 1040 to proceed with the normal call routing procedure to route the telephone call to the subscriber's telephone over the subscriber line 1037.

If, at 1402, the SCP 1050 finds a record identified by the directory number dialed by the caller, then the user associated with the directory number is a subscriber to the CPC service. The user has preferably registered, so the record indicates whether the user is currently connected the computer to the Internet 1070, along with any associated IP address. If the SCP 1050 determines from the record that the subscriber line 1037 is not currently connecting the computer 1010 to the Internet 1070, then the SCP notifies the SSP 1040 to proceed with the normal call routing procedure to route the telephone call over the subscriber line 1037. If a record in the Customer Profile Dataserver 1055 indicates that the user is a CPC customer, and is connected to the Internet, then the SCP 1050 retrieves the IP address and the session key associated with the user's Internet session. The SCP 1050 uses the directory number and/or the user identifier to query the Customer Profile Dataserver 1055 to retrieve the IP address provided by the user during registration.

At 1404, the SCP 1050 accesses the CPC Gateway Interface 1095 and sends a callNotify query. The callNotify query includes an event descriptor that includes information identifying characteristics of the call, such as the caller name, caller DN, and a timestamp. Circumstantial information may also be included in the event descriptor, such as a timestamp, or the number of times that caller has attempted the call. In response the callNotify query, the CPC Gateway Interface 1095 encrypts the callNotify query using the session key, connects to the user's PC, and (at 1406) forwards the callNotify query to the user's IP address requesting instructions as to how to handle the call.

Once received by the CPC Client Program 1030, the CPC Client Program 1030 decrypts the callNotify query and associated event descriptor (at 1408). The event descriptor can be displayed by the CPC Client Program 1030 as user readable call information, such as caller DN, caller name, and caller description. At 1410, the CPC Client Program 1030 generates, encrypts, and sends to the CPC Gateway Interface 1095 disposition instructions according to a call-handling option that was associated with the event descriptor according to the user configuration, or to the call-handling option that was selected by the user upon receiving notification of the call. At 1412, the CPC Gateway Interface 1095 decrypts the disposition instructions, which are forwarded back to the SCP, which disposes of the call according to the disposition instructions.

A data structure for communication between the user's PC and the CPC Gateway Interface 1095, according to certain embodiments of the invention is as follows:

```
enum Type /* message types */
{
    /*** pc registration ***/
    handShake    = 'h',           /* pc->CPC, handshake message */
    handShakeAck = 'H',           /* CPC->pc, handshake ack message */
    pcRegister   = 'r',           /* pc->scp, register pc's ip address & telno */
    pcRegAck     = 'R',           /* CPC->pc, register confirmation */
    /*** registration error conditions ***/
    Error        = 'e',           /* error, status field contains reason */
    TermNotify   = 'o',           /* CPC->scp, overload prob, terminate notification */
    /*** general errors ***/
    callerDisc   = 'D',           /* scp->pc, caller hung up */
    pcTimeout    = 'm',           /* pc->scp, timeout at pc end */
    pcDisc       = 'd',           /* CPC->scp, can't connect to pc */
    pcKnockoff   = 'k',           /* CPC->pc, pc being knocked off */
    /*** call notification ***/
    callNotify   = 'C',           /* scp->pc, call notification */
    endNotify    = 'E',           /* scp->CPC, end call notification */
    /*** call disposition ***/
    Send2vm      = 'v',           /* pc->scp, send to voice mail */
    Forward      = 'f',           /* pc->scp, forward call to callernum */
    Answer       = 'a',           /* pc->scp, answer, call accepted */
    Ignore       = 'i',           /* pc->scp, ignore call */
    /*** test ***/
    pcTest       = 't',           /* CPC->pc, connectivity test */
    pcTestAck    = 'T',           /* pc->pc, test ack */
    /*** I'm alive ***/
    IsAlive      = '?',           /* pc->CPC, application alive test */
    IsAliveAck   = 'A'            /* CPC->pc, application alive test ack */
};
struct message
{
    char version[4];              /* 0 - version number */
    char type;                    /* 4 - msg type */
    char status[3];               /* 5 - three char error code */
    char telno[10];               /* 8 - end user number, always present */
    char ip[IPLEN];               /* 18 - end user IP address always present */
    char osi;                     /* 33 - Other Services Indicator */
    char timestamp[10];           /* 34 - msg type = callNotify, 10 digit unix time; else
                                     blanks */
    char callernum[10];           /* 44 - msg type callNotify, callernum = forward,
                                     forward num else blanks */
    char callername[20];          /* 54 - msgtype = callNotify, caller name; else blanks*/
    char data[32];                /* 106 - session key for handShakeAck, passwd hash
                                     for pcRegister, session key for callNotify,else blanks*/
                                  /* total size = 106 */
                                  /* total encrypted size = 132 */
}.
```

In certain embodiments, the SCP 1050 receives instructions according to the user's direct interaction with a CPC Gateway Interface 1095. The CPC Gateway Interface 1095 is an online version of the CPC Client Program 1030 that the user accesses via an Internet connection from any computer with Internet access. Thus, the user can remotely access at least a limited version of the monitoring, configuration, and call-handling ability of the CPC Client Program 1030, without loading the CPC Client Program onto the computer. At least a limited version of the CND profiles established by the user using the CPC Client Program 1030 can be transmitted and stored on the computer network for access via the CPC Gateway Interface 1095.

Upon receiving instructions from the user and/or from the CPC Client Program 1030, the SCP causes the telephone call to be handled according to the selected call-handling option. As previously mentioned, call-handling options typically include answering the call, placing the call on hold, routing the call to voicemail, ignoring the call, and forwarding the call to a forwarding directory number.

If the instructions indicate that the user will answer the call, the SCP 1050 returns appropriate routing information to the SSP 1040, and the call is routed to the user. The user has the option to answer the call via the subscriber line, or via an Internet telephony utility, which is associated with an Internet telephony directory number. Assume for example that the user has opted to answer the call via Internet telephony, and that the Internet telephony utility is VoIP. To the SCP, VoIP is implemented very much like network-actuated call forwarding. The instruction received by the SCP instructs the SCP to forward the call to a VoIP directory number (VoIP DN), which has previously been mapped to the user's IP address. To receive the call using VoIP, the user must have installed a VoIP client application on the computer with which the user has connected to the Internet.

If user elects to place the call on hold, the CPC Client Program 1030 initiates a timer. The timer limits the amount of time that the CPC Client Program will wait for the user to choose a call-handling option. If the user makes a selection before the time has run out, then the CPC sends instructions to the SCP that correspond to the user's selection.

If the user chooses to route the call to a voicemail software application that runs on the user's PC, the CPC Client Program essentially informs the SCP that the user will take the call using the subscriber line. Then the CPC Client Program causes the voicemail application to answer the call. The user can also choose to route the call to a conventional subscription voicemail service by essentially forwarding the call to the voicemail number.

Exemplary Record Structure for the Customer Profile Dataserver

In certain embodiments of the invention, the Customer Profile Dataserver 1055 contains records that can be viewed from the perspective of the CPC Gateway Interface 1095 and of the SCP 1050. Each record is preferably stored in a format such as printable ASCII, and consists of data elements with various access types (e.g., read-only or read/write).

An exemplary customer profile data server record structure follows, as viewed from the perspective of the CPC Gateway Interface:

```
R/W
    struct CPCrecord        /* record read/written to/from DS */
    {
r   char tel[10];           /* number to be monitored, always present */
r   char status[3];         /* status returned by DS for operations*/
r   char monitor;           /* monitor flag 'n' - off, 'y' - on */
r   char activated;         /* activated flag 'n' - off, 'y' - on */
r   char osi;               /* other service indicator, default='0' */
r   char passwd[32];        /* md5 hash of user passwd */
r   char pckey[32];         /* pc key assigned at download time */
w   char try;               /* number failed login attempts */
w   char ip[15];            /* pc ip address or left justified host name */
w   char timestamp[10];     /* unix time; else '0' */
w   char sessionkey[32];    /* session key */
                            /* total size = 138 */
    };
``` where the access type of the data element is indicated by "r" for read-only, or "w" for read/write.

An exemplary customer profile data server record structure follows, as viewed from the perspective of the SCP:

```
R/W
    struct SCPrecord        /* record read/written to/from DS */
    {
r   char tel[10];           /* number to be monitored */
r   char status[3];         /* status returned by DS for operations*/
r   char monitor;           /* monitor flag 'n' - off, 'y' - on */
r   char osi;               /* other service indicator */
w   char ip[15];            /* pc IP address or left justified host name */
r   char sessionkey[32];    /* session key */
w   char activated;         /* activated flag 'n' - off, 'y' - on */
                            /* total size = 63 */
    };
``` where the access type of the data element is indicated by "r" for read-only, or "w" for read/write.

In a typical implementation of the CPC service, each record stored in the Customer Profile Dataserver 1055 corresponds to a user that subscribes to the CPC service and that is associated with at least one subscriber line serviced by the SSP 1040. Preferably, each directory number having the CPC service has a corresponding record in the Customer Profile Dataserver 1055. Generally, the record indicates whether the user associated with the directory number (DN) identifying the record is a CPC customer, and whether the user is currently connected to the Internet 1070 using any computer. More specifically, a customer can be identified as a CPC customer either by the existence of a record in the Customer Profile Dataserver 1055, or by the condition of a particular data element in the record, such as a flag.

Preferably, the record includes static data that never changes once the record has been created. The record also preferably includes dynamic data that may change whenever the CPC Gateway Interface 1095 updates the record to indicate that the user of the subscriber line 1037 associated with the DN identifying the record has logged onto or off the Internet 1070.

The static data may include a ON field storing the DN associated with the subscriber line 1037. The DN field may serve as a unique identifier for the record since there is preferably a one-to-one correspondence between records in the Customer Profile Dataserver and directory numbers having the CPC service.

The static data also preferably includes a subscriber's alias field, Essentially, the alias stored in the alias field serves as a password for updating the record. When the user sends a registration message to the CPC Gateway Interface 1095 in order to update the Customer Profile Dataserver record to indicate that the user is logged onto the Internet, the registration message includes the alias. Upon finding the record with a DN in the DN field that matches the DN supplied in the registration message, the CPC Gateway Interface 1095 compares the alias supplied in the registration message to the alias in the alias field. The CPC Gateway Interface 1095 then updates the record to indicate that the user is logged onto the Internet if the alias from the registration message matches the alias in the alias field. Because different records in the Customer Profile Dataserver have different aliases, requiring that an Internet session registration message includes an alias associated with the directory number prevents unauthorized persons from tampering with the subscriber's telephone and CPC service. Additional encryption and security protocols can also be implemented to increase the security of the registration process, particularly when the user accesses the Internet independently of the directory number that is in the Customer Profile Dataserver 1055.

The IP address field stores the IP address for communicating with the user over the Internet 1070 during an Internet session. A user's IP address may change from one Internet session to another. For example, a user's IP address for one Internet account at a first ISP is typically different than the users IP address at a second Internet account at a second ISP. Accordingly, the IP address is obtained from the registration message sent by the CPC client program 1030 to the CPC Gateway Interface 1095 communicating with that user over the Internet 1070 during that Internet session. The CPC Gateway Interface 1095 can then store this IP address in the IP address field while updating the record to indicate that the user is logged onto the Internet. When the CPC Gateway Interface 1095 determines that the user has logged off the Internet (by receipt of a new registration message or by expiration of the IP address), the user's IP address is preferably deleted from the IP address field.

The SCP 1050 searches for the record in the Customer Profile Dataserver 1055 corresponding to the user identifier supplied by the SSP 1040 in a query for routing instructions. Searching the Customer Profile Dataserver 1055 for a particular customer identifier allows the SCP 1050 to associate one IP address with all directory numbers that belong to the user. The SCP 1050 determines if the IP address field contains an IP address. If the IP address field is empty, then the user is not logged onto the Internet 1070. On the other hand, the user is logged onto the Internet 1070 if the IP address field contains an IP address. The SCP 1050 retrieves this IP address from the Customer Profile Dataserver to notify the user over the Internet 1070 of the incoming call.

In an Internet session encryption key field, the CPC Gateway Interface 1095 optionally stores an encryption key for a current Internet session. An CPC Gateway Interface 1095 can send secure messages to the user and receive secure messages from the user over the Internet 1070 using the Internet session encryption key. Encryption methods are well known to those skilled in the art. Because the Internet session encryption key may change from Internet session to Internet session for increased security, the SCP 1050 may update the Internet session encryption key field during the registration process.

During the registration process, the CPC Gateway Interface 1095 may also update an "other services field" of the record using information supplied in the registration message. The field identifies the other services and/or features to which the user associated with the DN subscribes. The services and/or features may require special handling when the CPC service is active. These features may include Internet Call Waiting (IGW), RINGMASTER service, call forwarding, voicemail, call waiting, and anonymous call rejection. In response to a routing instruction query from the SSP 1040, the SCP 1050 may consult the field in order to determine the proper routing instructions for the SSP 1040 to accommodate all the subscriber's services.

Typically, the record is created when the user orders the CPC service. Such an order may be placed in a variety of ways. For instance, CPC service may be ordered manually, such as by speaking over the telephone with a telephone company service representative, sending the phone company a written order, or signing up for the CPC service through the telephone company's Web site. Alternatively, CPC service can be ordered automatically, such as when the user attempts to register using a CPC Client Program or a browser to directly access the CPC Gateway Interface 1095.

If an order for CPC service is placed manually, information needed to implement the CPC service may be entered into a service management system, which is functional for remotely programming the CPC Gateway Interface 1095. The service management system instructs the CPC Gateway Interface 1095 to create a record in the Customer Profile Dataserver for the subscriber.

An order for CPC service is placed automatically when the user causes registration information to be sent to the CPC Gateway Interface 1095. The CPC Gateway Interface 1095 can recognize the registration attempt as a CPC service order in an number of ways. For example, a user's first registration attempt may include a data element that informs the CPC Gateway Interface 1095 that a new user is requesting CPC service. Alternatively, upon receiving registration information from a user for whom no record exists in the customer profile dataserver, the CPC Gateway Interface 1095 may interpret the registration attempt as a request for CPC service. The CPC provider typically also provides telephone service to the user, so prequalification for CPC service may not be required for a CPC service order to be approved. The CPC Gateway Interface 1095 may communicate the receipt of a CPC service order to the IT system for the PSTN, to incorporate the service into the provider's billing system.

After a Customer Profile Dataserver record is created in response to a CPC service order, the CPC Gateway Interface 1095 stores the static data in the record. Typically, the alias needed to verify registration messages is created by the CPC provider in response to an order for the CPC service. This alias is provided to the service management system for inclusion in the static data of the record. This alias is also encoded into the CPC Client Program 1030 provided to the user to enable the CPC service. Because the CPC Client Program 1030 automatically includes the alias in registration messages that it creates, the user need not know about the alias, One skilled in the art should recognize that many variations of the embodiments implementing CPC service are possible.

For instance, the concept of a CPC service could also be applied in a wireless situation In such an embodiment, the subscribers telephone service is wireless, and the user desires increased options for handling calls to the wireless telephone.

It should be appreciated that multiple directory numbers may be associated with a single subscriber line, and multiple subscriber lines may be associated with a single user. Accordingly, it is contemplated that the user of a subscriber line may register multiple directory numbers to be monitored at once. Thus, the user may receive notification of calls to any of the directory numbers associated with the user while logged onto the Internet or using the CPC Client Program. The user may also implement a number of call-handling preferences to handle calls to any or all of the directory numbers.

One skilled in the art should recognize the CPC service could be implemented over wide area networks using protocols other than the Internet protocol. Also, alternative telephone network components and triggers could be used for call routing. Additionally, various encryption methods for sending secure messages over the Internet are known to those skilled in the art. Although network-actuated subscriptions are not required, the CPC service may be compatible with subscription services such as caller ID and call forwarding. For example, if the user has activated a call forwarding subscription, the CPC service can still enable the user to monitor calls placed to the user's subscriber line. The user can configure the CPC to implement call-handling options that override the network-actuated call forwarding with respect to calls with certain characteristics.

Other alternative embodiments will become apparent to those skilled in the art to which an exemplary embodiment pertains without departing from its spirit and scope. Accordingly, the scope of the present invention is defined by the appended claims rather than the foregoing description.

What is claimed is:

1. A method for handling calls placed to a subscriber line, comprising:
    retrieving, by a device, a network address that is associated with the subscriber line, wherein the subscriber line is associated with a plurality of directory numbers;
    detecting, by the device, a telephone call to one of the plurality of directory numbers;
    in response to the detecting the telephone call, sending, by the device, an event descriptor to the network address;
    receiving, by the device, an instruction indicating a call-handling option selected by a user from a plurality of call-handling options; and
    handling, by the device, the telephone call according to the call-handling option selected by the user;
    wherein the network address comprises an internet protocol address.

2. The method of claim 1, further comprising:
    providing the user with a graphical user interface that includes controls for selecting the call-handling option from the plurality of call-handling options.

3. The method of claim 2, further comprising:
    causing the graphical user interface to display call information based upon the event descriptor.

4. The method of claim 3, wherein causing the graphical user interface to display call information comprises:
    identifying a caller to the user.

5. The method of claim 4, wherein the identifying the caller comprises displaying a caller directory number associated with the telephone call.

6. The method of claim 4, wherein the identifying the caller comprises identifying a caller name associated with the telephone call.

7. The method of claim 4, wherein the identifying the caller comprises displaying a caller description associated with the telephone call.

8. The method of claim 1, wherein the plurality of call-handling options comprises:
answering the call, placing the call on hold, routing the call to voicemail, ignoring the call, and forwarding the call to a forwarding directory number.

9. The method of claim 1, further comprising:
retrieving a user identifier;
upon retrieving the user identifier, prompting the user for a password; and
authenticating an identity of the user by determining whether the password corresponds to the user identifier.

10. The method of claim 9, further comprising:
exchanging an encryption key with the user; and
decrypting the user identifier using the encryption key.

11. The method of claim 9, further comprising:
exchanging an encryption key with the user; and
decrypting a portion of the password using the encryption key.

12. The method of claim 1, wherein the call-handling option is selected by the user prior to sending the event descriptor.

13. The method of claim 2, wherein the providing the user with the graphical user interface comprises:
storing the plurality of call-handling options in a database local to a monitoring computer.

14. The method of claim 1, further comprising:
storing the network address and a user identifier in a customer profile;
wherein the sending the event descriptor comprises retrieving the network address from the customer profile.

15. A tangible computer-readable medium storing executable instructions which, when executed by a processing unit, cause the processing unit to perform operations, the operations comprising:
sending a network address associated with a subscriber line to be registered;
providing a user of the subscriber line with a graphical user interface that includes a plurality of call-handling options;
receiving an input from the user comprising a plurality of directory numbers associated with the subscriber line to be monitored;
prompting the user to pre-select a call-handling option of the plurality of call-handling options to be transmitted upon receiving a notification of an incoming call to a directory number of the plurality of directory numbers that has a particular characteristic;
receiving from a telephone network at the network address the notification of the incoming call to the directory number that has the particular characteristic; and
transmitting to the telephone network the call-handling option pre-selected by the user;
wherein the network address comprises an internet protocol address.

16. The tangible computer-readable medium of claim 15, wherein the receiving from the telephone network the notification of the incoming call comprises:
receiving a notification message;
decrypting the notification message;
identifying the call-handling option pre-selected by the user, according to the particular characteristic of the incoming call; and
encrypting the call-handling option pre-selected by the user.

17. The tangible computer-readable medium of claim 15, wherein the telephone network comprises the internet.

18. The tangible computer-readable medium of claim 15, wherein each call-handling option of the plurality of call-handling options specifies a method for handling the incoming call.

19. The tangible computer-readable medium of claim 15, wherein the prompting the user to pre-select the call-handling option of the plurality of call-handling options further comprises associating in a database characteristics of incoming calls with one of the plurality of call-handling options.

20. The tangible computer-readable medium of claim 19, wherein the characteristics of incoming calls comprise a date, a time-of-day, and a caller directory number.

21. A system for handling calls placed to a subscriber line, comprising:
a device for:
retrieving a network address that is associated with the subscriber line, wherein the subscriber line is associated with a plurality of directory numbers;
detecting a telephone call to one of the plurality of directory numbers;
sending an event descriptor to the network address in response to detecting the telephone call;
receiving an instruction indicating a call-handling option selected by a user from a plurality of call-handling options; and
handling the telephone call according to the call-handling option selected by the user;
wherein the network address comprises an internet protocol address.

22. The system of claim 21, wherein the user is provided with a graphical user interface that includes controls for selecting the call-handling option from the plurality of call-handling options.

23. The system of claim 22, wherein the graphical user interface displays call information based upon the event descriptor.

24. The system of claim 21, wherein the plurality of call-handling options comprises:
answering the call, placing the call on hold, routing the call to voicemail, ignoring the call, and forwarding the call to a forwarding directory number.

25. The system of claim 21, further comprising a gateway for:
retrieving a user identifier;
prompting the user for a password upon retrieving the user identifier; and
authenticating an identity of the user by determining whether the password corresponds to the user identifier.

26. The system of claim 25, wherein the gateway is further for:
exchanging an encryption key with the user; and
decrypting the user identifier using the encryption key.

27. The system of claim 21, wherein the network address and a user identifier are stored in a customer profile, wherein the sending the event descriptor comprises retrieving the network address from the customer profile.

* * * * *